US010677382B2

(12) United States Patent
Ahn et al.

(10) Patent No.: US 10,677,382 B2
(45) Date of Patent: Jun. 9, 2020

(54) PIPE JOINT DEVICE AND METHOD FOR MANUFACTURING THE SAME

(71) Applicant: JOIN TOP. CO., LTD., Paju-si (KR)

(72) Inventors: Jae-Min Ahn, Psju-si (KR); Gyu-Chan Lee, Psju-si (KR); Nam-Hyung Cho, Psju-si (KR)

(73) Assignee: JOIN TOP. CO., LTD., Paju-Si (KR)

( * ) Notice: Subject to any disclaimer, the term of this patent is extended or adjusted under 35 U.S.C. 154(b) by 284 days.

(21) Appl. No.: 15/661,874

(22) Filed: Jul. 27, 2017

(65) Prior Publication Data
US 2018/0038537 A1    Feb. 8, 2018

(30) Foreign Application Priority Data

Aug. 3, 2016 (KR) .................. 10-2016-0098848

(51) Int. Cl.
*F16L 21/02* (2006.01)
*F16L 37/092* (2006.01)
*B21D 39/04* (2006.01)
*B21D 26/051* (2011.01)

(52) U.S. Cl.
CPC ........ *F16L 37/0925* (2013.01); *B21D 26/051* (2013.01); *B21D 39/04* (2013.01); *F16L 37/0927* (2019.08)

(58) Field of Classification Search
CPC ... F16L 37/0925; F16L 37/0927; F16L 21/02; F16L 37/08; F16L 37/084; F16L 37/092; B21D 26/051; B21D 39/04; B21D 39/048; B21D 41/02; B21D 19/12; B21D 39/20; B21D 41/026; B21D 26/049; B21D 41/04; B21D 41/045; B21D 19/14; B21D 19/16
See application file for complete search history.

(56) References Cited

U.S. PATENT DOCUMENTS

| 880,410 A | * | 2/1908 | Taylor ................ B65D 5/6614 229/125 |
| 3,461,544 A | * | 8/1969 | Rickard ................ B21D 39/04 29/507 |
| 5,007,667 A | * | 4/1991 | Unewisse ............. B21D 39/04 285/369 |

FOREIGN PATENT DOCUMENTS

WO    WO-2016080582 A1 *  5/2016  .............. B23P 21/00

* cited by examiner

*Primary Examiner* — Jun S Yoo

(57) ABSTRACT

A pipe joint device configured to interconnect two pipes to be inserted therein through openings of both opened ends thereof including a joint main body and a joint assembly disposed in the joint main body is provided. The joint main body includes a small-diameter part formed at a central part and large-diameter parts formed at both sides of the small-diameter part. Each of the large-diameter parts has a first horizontal part, a diameter-reduced part of which a diameter gradually decreases from the first horizontal part toward the opening, and a second horizontal part extending horizontally from the diameter-reduced part toward the opening. A portion of each of the second horizontal parts is configured as a curled part inclined toward an outer-diameter direction and the opening of the pipe joint device and then again inclined toward an inner-diameter direction and the opening and having a mountain-shaped section as a whole.

7 Claims, 4 Drawing Sheets insert components first curling second curling final product

PIPE JOINT DEVICE AND METHOD FOR MANUFACTURING THE SAME

CROSS-REFERENCE TO RELATED APPLICATION

The present application claims priority under 35 U.S.C. 119A to Korean Patent Application No. 10-2016-0098848 Filed on Aug. 3, 2016, which is herein incorporated by reference in its entirety.

TECHNICAL FIELD

The present invention relates to a pipe joint device, and more particularly, to a pipe joint device capable of enabling pipings for water supply, heating and cooling and air conditioning, which are used for industry or home, to be easily attached and detached, and having improved an assembling property of a component, and a method for manufacturing the same.

RELATED ART

A pipe joint device configured to couple two pipes has been known (for example, refer to a Korean Utility Model Application Publication No. 20-2012-2695A).

In general, a pipe joint device is a mechanical device configured to couple pipings into a variety of forms such as a linear shape, an elbow shape, a T-shape, a cross shape and the like upon establishment of a piping facility, and is widely used for industry and home.

A general pipe joint device that has been widely used in the related art requires a separate fixing means such as a welding of a connection part and a screw means so as to increase connectivity and airtightness of the pipes. Therefore, a pipe coupling work is troublesome and an assembling process increases, which increase the construction cost.

Also, a usual steel pipe for piping, which is used for the pipe joint device of the related art is thin, so that it is difficult to perform the welding or the screwing at the construction site. Also, a separate process of using a dedicated compressor is required, for example.

In the meantime, in the pipe joint device, mechanical elements such as a backup ring, an O-ring and the like are mounted so as to fix a pipe inserted in the device and to easily pull out the inserted pipe. In order to stably keep the mechanical elements in the pipe joint device, a variety of configurations have been suggested. In one configuration, an inner peripheral surface of the pipe joint device is tapered or is formed with separate grooves so that the mechanical elements do not move in the pipe joint device. In another configuration, a separate support element for supporting the mechanical element is provided in the pipe joint device. However, according to the former configuration, it is not easy to process the inner peripheral surface of the pipe joint device of which a thickness is not so great. Also, when the recesses or the like are formed, the strength may be lowered. According to the latter configuration, the separate support element is provided, so that the structure becomes complicated and the cost increases. Regarding this, the pipe joint device is manufactured by the casting. However, since it is necessary to form the tapered surface, the groove and the like for supporting the mechanical elements on the inner peripheral surface, a mold of high mechanical precision is required upon the casting, which increases the cost.

SUMMARY OF THE INVENTION

Problems to be Solved

The present invention has been made in view of the above situations, and an object of the present invention is to provide a pipe joint device capable of stably keeping a variety of mechanical elements in the pipe joint device configured to connect two pipes without a separate support member and without separately processing an inner peripheral surface of the pipe joint device, and a method for manufacturing the same.

Another object of the present invention is to provide a structure for stably supporting a variety of mechanical elements, which are provided in the pipe joint device configured to connect two pipes, by a mechanical process rather than a casting method.

Means for Solving the Problems

In order to achieve the above objects, according to one aspect of the present invention, there is provided a method of manufacturing a pipe joint device configured to interconnect two pipes through openings formed at both opened ends thereof. The method includes a step of disposing a straight pipe having a single diameter between a lower mold and an upper mold of a mold for pipe expansion, a step of performing a pipe expansion process of inserting punches for pipe expansion through both openings of the pipe and forming a joint main body having a small-diameter part of a first diameter at a central part of the joint main body and large-diameter parts formed at both sides of the small-diameter part and having a second diameter greater than the first diameter, a step of inserting a joint assembly for supporting pipes to be inserted into the joint device through both openings of the joint main body, a first curling step of performing a curling process for both openings of the joint main body having the joint assembly inserted therein to thereby form first horizontal parts of the second diameter, diameter-reduced parts of which diameters gradually decrease from the first horizontal parts toward the openings, and second horizontal parts extending horizontally from the diameter-reduced parts toward the openings and having a diameter smaller than the first horizontal parts in the vicinity of the openings, and a second curling step of performing a further curling process for the joint main body for which the first curling process has been performed to thereby incline at least a portion of each of the second horizontal parts toward an outer-diameter direction and the opening of the pipe joint device and then toward an inner-diameter direction and the opening, thereby forming curled parts of which a sectional shape is a mountain shape as a whole.

In one illustrative embodiment, the joint main body may be obtained by a plurality of pipe expanding processes.

In one illustrative embodiment, the first curling step may be performed using a first curling die including a first curling-dedicated die for placing therein the joint main body and a first curling-R die having a shape corresponding to the diameter-reduced part and the second horizontal part and having a curling punch mounted thereto, the curling punch being inserted into the joint main body.

In one illustrative embodiment, the second curling step may be performing using a second curling die including a second curling-dedicated die for placing therein the joint main body having been subjected to the first curling step and a second curling-R die having a shape corresponding to the curled part and having a curling punch mounted thereto, the curling punch being inserted into the joint main body.

In one illustrative embodiment, in each step, a separate casting process is not performed.

In one illustrative embodiment, the joint assembly may include a jaw holder mounted in the joint main body in the vicinity of the opening and configured to grip and support an outer diameter of the pipe inserted into the joint main body, and a plurality of jaws formed with being circumferentially spaced may be formed on a circumferential surface of the jaw holder.

In one illustrative embodiment, each of the jaws may be a tooth-shaped portion protruding in an inner-diameter direction of the joint main body and inclined in an insertion direction of the pipe.

According to another aspect of the present invention, there is provided a pipe joint device configured to interconnect two pipes to be inserted therein through openings of both opened ends thereof. The pipe joint device includes a joint main body and a joint assembly disposed in the joint main body and configured to support pipes to be inserted into the joint device. The joint main body includes a small-diameter part of a first diameter formed at a central part and large-diameter parts formed at both sides of the small-diameter part and having a second diameter greater than the first diameter. Each of the large-diameter parts has a first horizontal part of the second diameter, a diameter-reduced part of which a diameter gradually decreases from the first horizontal part toward the opening, and a second horizontal part extending horizontally from the diameter-reduced part toward the opening and having a diameter smaller than the first horizontal part. At least a portion of each of the second horizontal parts is configured as a curled part inclined toward an outer-diameter direction and the opening of the pipe joint device and then again inclined toward an inner-diameter direction and the opening and having a mountain-shaped section as a whole. The joint main body is formed by a mechanical process of pipe expansion and curling without a casting process.

In one illustrative embodiment, the joint assembly may include a jaw holder mounted in the joint main body in the vicinity of the opening and configured to grip and support an outer diameter of the pipe inserted into the joint main body, and a plurality of jaws formed with being circumferentially spaced may be formed on a circumferential surface of the jaw holder.

In one illustrative embodiment, each of the jaws may be a tooth-shaped portion protruding in an inner-diameter direction of the joint main body and inclined in an insertion direction of the pipe.

Effects of the Invention

According to the present invention, it is possible to provide the pipe joint device having the structure capable of stably keeping a variety of mechanical elements in the pipe joint device without a separate support member and without separately processing an inner peripheral surface of the pipe joint device.

BRIEF DESCRIPTION OF DRAWINGS

FIGS. 1A and 1B are sectional views depicting a structure of a pipe joint device in accordance with an illustrative embodiment of the present invention, in which FIG. 1A is a sectional view depicting an intermediate-step structure of a final pipe joint device, i.e., a structure after a first curling process, and FIG. 1B depicts a structure of a final pipe joint device, i.e., a structure after a second curling process.

DETAILED DESCRIPTION OF ILLUSTRATIVE EMBODIMENTS

Hereinafter, illustrative embodiments of the present invention will be described with reference to the accompanying drawings. In the below, descriptions on well-known configurations in the related art, for example, functions and detailed configurations of diverse mechanical elements to be provided in a pipe joint device are omitted. That is, the mechanical elements are to support pipes inserted into the pipe joint device and some of the mechanical elements do not configure a gist of the present invention. Although the descriptions are omitted, one skilled in the art can easily understand the characteristic configurations of the present invention with reference to the following descriptions.

Figure 1A:
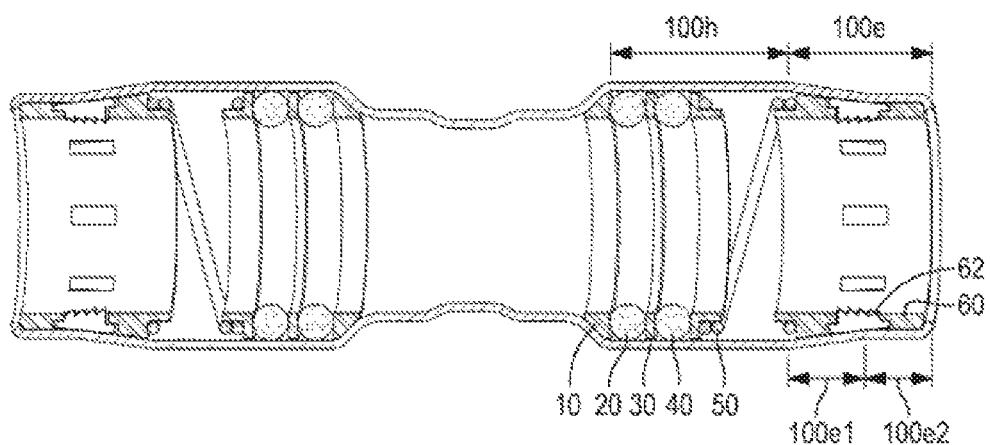
Figure 1B:
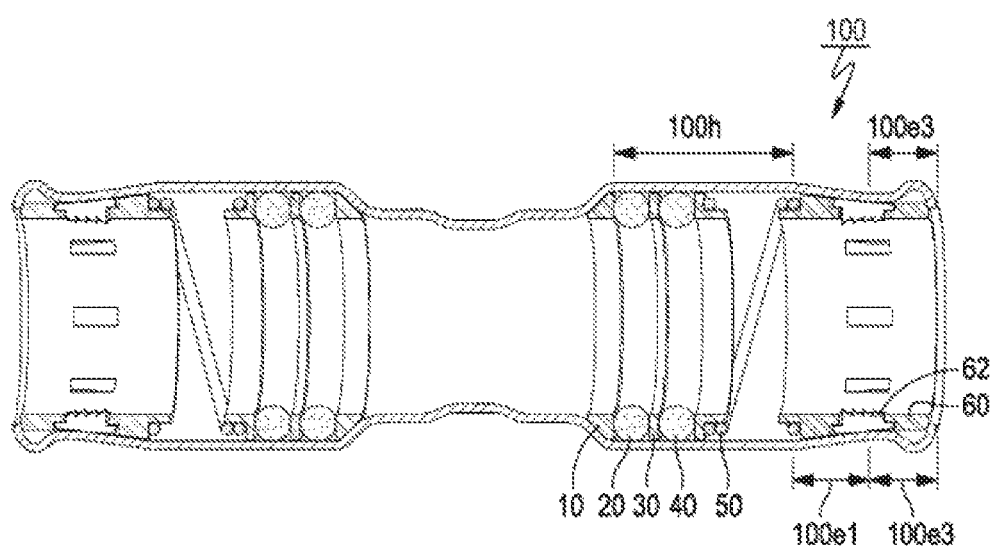

First, referring to FIGS. 1A and 1B, which are sectional views depicting a structure of a pipe joint device in accordance with an illustrative embodiment of the present invention, FIG. 1A is a sectional view depicting an intermediate-step structure of a final pipe joint device, and FIG. 1B depicts a structure of a final pipe joint device.

As shown in FIG. 1B, a pipe joint device 100 of the illustrative embodiment has both opened ends, so that two pipes are inserted through the openings and can be interconnected. Also, as shown, the configurations in the vicinity of both ends of the pipe joint device are the same. A pipe inserted into the pipe joint device is assembled, fixed and supported by a variety of shown mechanical elements 10, 20, 30, 40, 50, 60 (hereinafter, referred to as 'joint assembly'). Also, the pipe inserted into the pipe joint device can be separated from the device by a separation member referred to as a remover.

Specifically, a first backup ring 10 and a second backup ring 20 of the joint assembly are usually configured by metallic flat washers (however, the present invention is not limited thereto), and are configured to support a first O-ring 20, a second O-ring 40, a spring 50 and a jaw holder 60.

The first and second O-rings 20, 40 are made of an elastic material such as rubber (however, the present invention is not limited thereto) and are configured to closely contact the pipe inserted into the pipe joint device 100 and to secure a stable and airtight connection between the pipe and the pipe joint device.

The spring 50 is provided between a spring guide (not shown) and the jaw holder 60 and is configured to elastically support the jaw holder 60 and to return the jaw holder 60 to its original position after the jaw holder 60 is pushed by the remover (refer to FIG. 2) and the pipe is thus separated.

The jaw holder 60 is provided so as to grip and support an outer diameter of the pipe inserted into the pipe joint device 100 and includes a plurality of jaws 62 formed on its circumferential surface with being spaced in a circumferential direction. That is, the jaw 62 is a kind of a tooth-shaped portion protruding in an inner-diameter direction of the pipe joint device and is configured to engage with an outer-diameter part of the pipe inserted into the pipe joint device and to support the pipe. Meanwhile, in the present invention, the tooth-shaped portion of the jaw 62 is inclined in an insertion direction of the pipe (refer to FIG. 2B), so that it functions as a resistance in a pulling direction of the inserted pipe without disturbing the insertion of the pipe. Thereby, an arbitrary separation of the pipe is prevented, which configures a feature of the present invention.

In the below, a configuration in the vicinity of the opening of the pipe joint device 100 is described in more detail.

As shown in FIGS. 1 and 2, both sides of the pipe joint device 100 are formed to have a plurality of diameters, rather than a straight pipe having one diameter. That is, as described later, a straight pipe having one diameter is subjected to a plurality of pipe expanding processes, so that spaces for inserting therein the joint assemblies and the pipes are secured (refer to FIG. 3). According to the present invention, the expanded pipe is not used as the pipe joint device, as it is. Instead, as shown, the joint assemblies are inserted into the expanded pipe and a first curling processing is then performed for both openings.

Figure 2A:
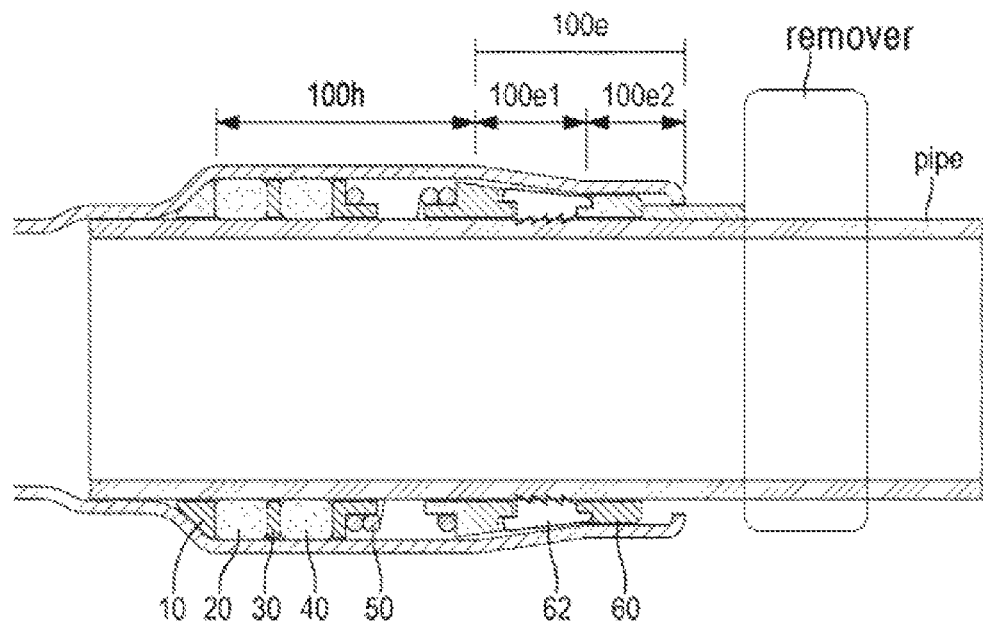
FIGS. 2A and 2B depict in detail structures of an end portion of the pipe joint device after the first and second curling processes.

An outward shape of the pipe joint device after the first curling process is shown in FIG. 1A, FIG. 4, and FIG. 2A (a configuration in the vicinity of the opening is shown with being enlarged). As shown in FIGS. 1A and 2A, after the first curling process, a first curled part 100e continuing to a first horizontal part 100h formed by the pipe expanding process is formed in the vicinity of the opening of the pipe joint device. The first curled part 100e has a diameter-reduced part 100e1 of which a diameter gradually decreases from the first horizontal part 100h toward the opening and a second horizontal part 100e2 extending horizontally from the diameter-reduced part to the opening and having a diameter smaller than the first horizontal part. The second horizontal part 100e2 is bent at an end thereof toward an inner diameter-side of the pipe joint device. By the diameter-reduced part 100e1, it is possible to fixedly keep the joint assembly in the pipe joint device. Also, by the second horizontal part 100e2, it is possible to stably keep the joint assembly and to enable the joint assembly to more closely contact the pipe. That is, if only the diameter-reduced part is provided without the second horizontal part, the close contact with the pipe is not made at an end of the diameter-reduced part. Therefore, it is preferably to form the second horizontal part and to perform the curling process so that a portion of the second horizontal part is bent into the pipe joint device.

By the first curling process, it is possible to stably keep the joint assembly in the pipe joint device so that it is not pulled outward. The pipe joint device at this state can stably keep the pipe inserted therein. In the meantime, in some cases, it may be necessary to again separate the pipe inserted into the pipe joint device to the outside. When performing the corresponding operation, a remover is used. That is, the remover is inserted between the pipe joint device and the pipe so as to push the jaw holder, so that a gap is formed between the jaw holder and the pipe. Through the gap, the pipe is pulled outward. However, after the first curling process, a length of the bent portion, which is bent at the end of the second horizontal part toward the inner diameter-side of the pipe joint device, is shorter than a length necessary for insertion of the remover (for example, a space necessary for insertion of the remover is 1 mm but the length of the bent portion is 0.85 mm). According to the observation of the inventors, it is very difficult to mechanically form the bent portion having the short length. Even though such bent portion is made, the tensile force for preventing the pipe from being pulled out is not sufficiently secured.

Therefore, when it is intended to use the pipe joint device not only for a utility in which the pipe is inserted and fixedly used without being pulled out but also for a utility in which the inserted pipe is again pulled out, a configuration capable of satisfying both requirements of stable support of the pipe and easy removal of the inserted pipe is required.

Figure 2B:
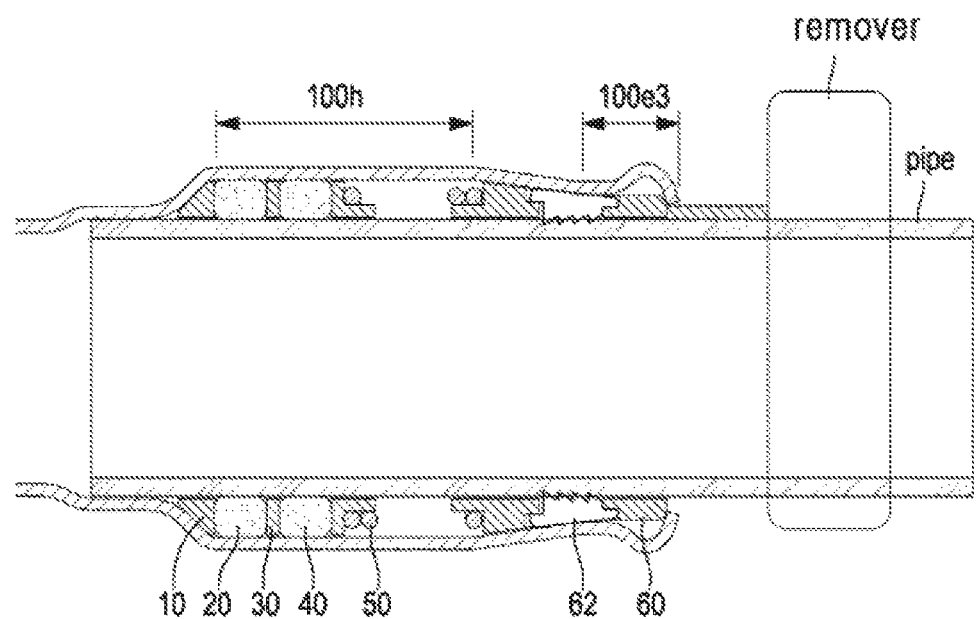

To this end, the inventors conceived a pipe joint device having an outward structure as shown in FIGS. 1B and 2B, which is obtained by performing a second curling process for a pipe joint device for which the first curling process has been performed. As can be easily seen from an enlarged view of FIG. 2B, when the second curling process is performed, a portion of the second horizontal part 100e2 is inclined toward an outer-diameter direction and the opening and is then again inclined toward an inner-diameter direction and the opening, so that it is formed into a second curled part 100e3 of which a sectional shape is a mountain shape as a whole. That is, by the second curling process, it is possible to implement a configuration in which a space for inserting therein a remover is secured and the inserted pipe is not pulled out well by a close contact with the pipe.

In the below, a process of manufacturing the pipe joint device in accordance with an illustrative embodiment of the present invention is described with reference to FIGS. 3 and 4.

Figure 3A:
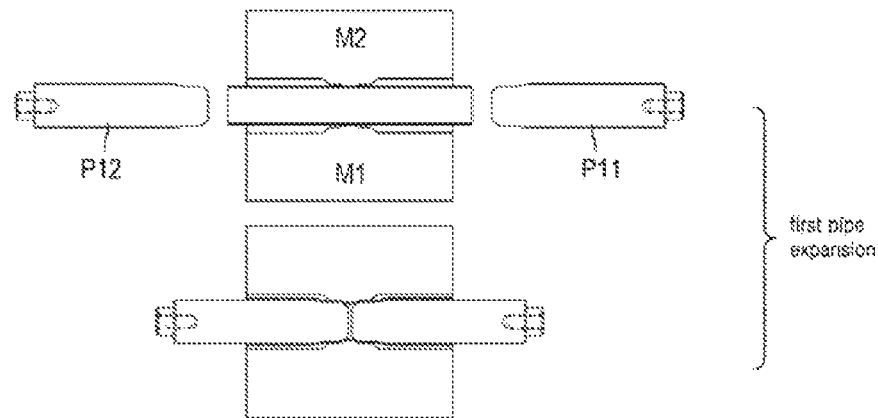
FIGS. 3A, 3B, and 3C depict a process of manufacturing the pipe joint device in accordance with an illustrative embodiment of the present invention (a pipe expanding process).
Figure 3B:
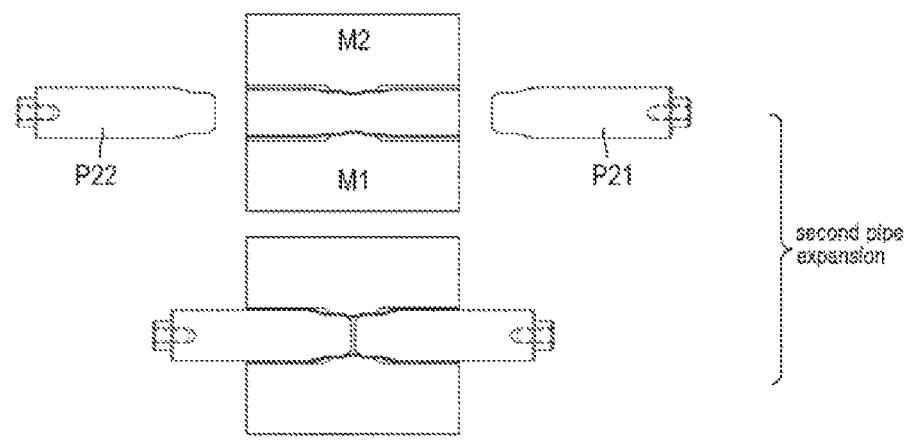
Figure 3C:
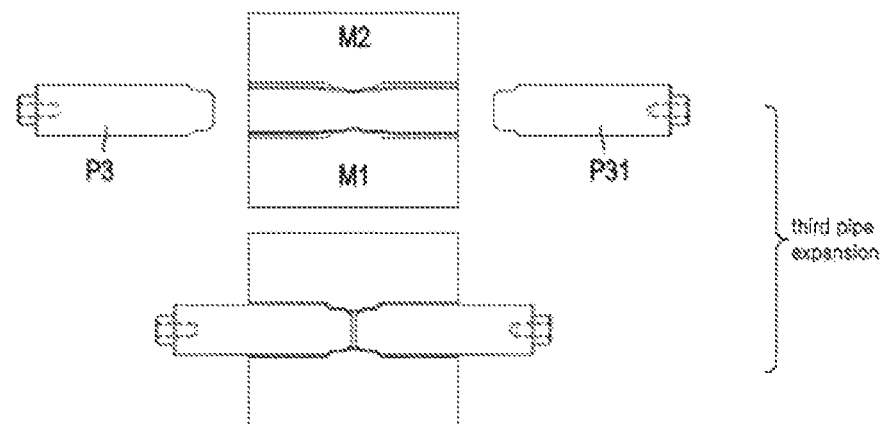

First, a straight pipe having a single diameter is disposed between a lower mold M1 and an upper mold M2 of a mold for pipe expansion and a first pipe expansion process of inserting punches P11, P12 for first pipe expansion through both openings of the pipe is performed (FIG. 3A). Then, a second pipe expansion process of inserting punches P21, P22 for second pipe expansion having diameters greater than the punches P11, P12 for first pipe expansion through both openings of the pipe having been subjected to the first pipe expansion process is performed (FIG. 3B). Then, a third pipe expansion process of inserting punches P31, P32 for third pipe expansion having diameters greater than the punches P21, P22 for second pipe expansion through both openings of the pipe having been subjected to the second pipe expansion process is performed (FIG. 3C). Thereby, a diameter of the straight pipe is configured in conformity to a diameter of a pipe to be inserted (FIG. 3C). In this way, the reason to configure a diameter of the straight pipe in conformity to a diameter of a pipe to be inserted, instead of performing a pipe expansion process once, is described. That is, if a pipe is expanded at one time, the pipe may be damaged due to the sudden pipe expansion.

Figure 4A:
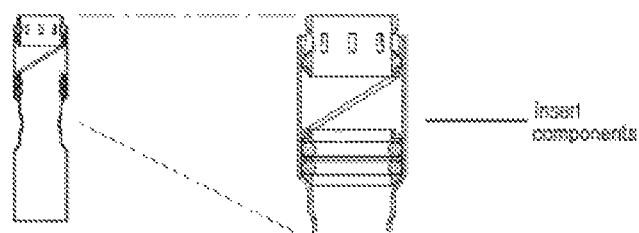
FIGS. 4A, 4B. 4C, and 4D depict a process of manufacturing the pipe joint device in accordance with an illustrative embodiment of the present invention, in which a process of forming features of the pipe joint device through the first and second curling processes is shown.

Then, the joint assemblies are inserted through both openings of the expanded pipe (joint main body) having been subjected to the above pipe expansion processes (FIG. 4A).

Figure 4B:
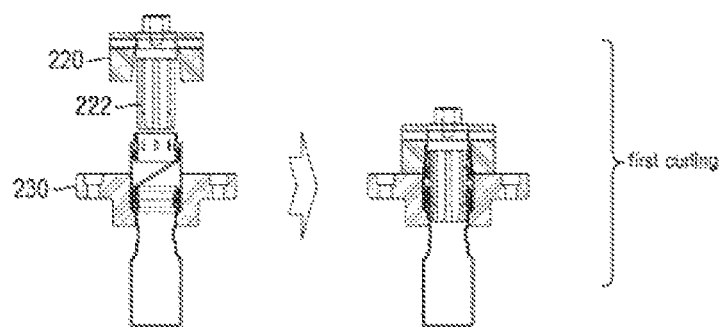

Then, the expanded pipe having the joint assemblies inserted therein is disposed in a first curling-dedicated die 230. Then, a first curing-R die 220 having a curling punch 222 mounted thereto is moved into the expanded pipe. At this time, the first curling-R die has a shape corresponding to the diameter-reduced part 100e1 and the second horizontal part 100e2 shown in FIGS. 1A and 2A. Therefore, when the first curing-R die 220 is inserted into the expanded pipe, a pipe having an outward shape shown in FIGS. 1A and 2A can be obtained (FIG. 4B).

Figure 4C:
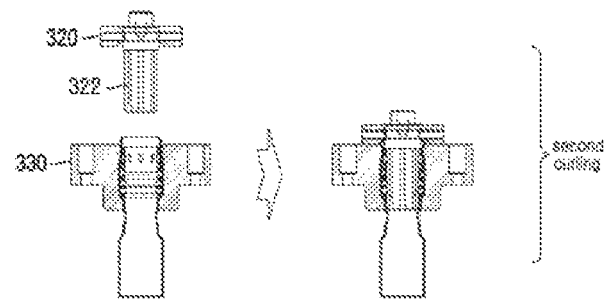
Figure 4D:

The pipe having been subjected to the first curling process is disposed in a second curling-dedicated die 330. Then, a second curing-R die 320 having a curling punch 322 mounted thereto is moved into the curled pipe. At this time, the second curling-R die has a shape corresponding to the second curled part 100e3 shown in FIGS. 1B and 2B. Therefore, when the second curing-R die 320 is inserted into the expanded pipe, a pipe having an outward shape shown in FIGS. 1B and 2B, i.e., a pipe joint device can be obtained (FIG. 4C). In this way, according to the illustrative embodiment of the present invention, it is possible to implement a desired configuration of the pipe joint device by the mechanical processes of the pipe expansion process and the curling processing, instead of forming the pipe joint device by a casting process, so that it is not necessary to form a mold for casting with high precision.

Although the present invention has been described with reference to the illustrative embodiment, the present invention is not limited to the illustrative embodiment. That is, the illustrative embodiment can be diversely modified and changed within the scope of the claims to be described later. The modifications and changes are also included in the scope of the present invention. That is, the present invention is limited by the claims and equivalents thereto.

The invention claimed is:

1. A method of manufacturing a pipe joint device configured to interconnect two pipes through openings formed at both opened ends thereof, the method comprising:
    a step of disposing a straight pipe having a single diameter between a lower mold and an upper mold of a mold for pipe expansion;
    a step of performing a pipe expansion process of inserting punches for pipe expansion through both openings of the pipe and forming a joint main body having a small-diameter part of a first diameter at a central part of the joint main body and large-diameter parts formed at both sides of the small-diameter part and having a second diameter greater than the first diameter;
    a step of inserting a joint assembly for supporting pipes to be inserted into the joint device through both openings of the joint main body;
    a first curling step of performing a curling process for the both openings of the joint main body having the joint assembly inserted therein to thereby form first horizontal parts of the second diameter, diameter-reduced parts of which diameters gradually decrease from the first horizontal parts toward the openings, and second horizontal parts extending horizontally from the diameter-reduced parts toward the openings and having a diameter smaller than the first horizontal parts in the vicinity of the openings, and
    a second curling step of performing a further curling process for the joint main body for which the first curling process has been performed to thereby incline at least a portion of each of the second horizontal parts toward an outer-diameter direction and the opening of the pipe joint device and then toward an inner-diameter direction and the opening, thereby forming curled parts of which a sectional shape is a mountain shape as a whole.

2. The method according to claim 1, wherein the joint main body is obtained by a plurality of pipe expanding processes.

3. The method according to claim 2, wherein the first curling step is performed using a first curling die comprising a first curling-dedicated die for placing therein the joint main body and a first curling-R die having a shape corresponding to the diameter-reduced parts and the second horizontal parts and having a curling punch mounted thereto, the curling punch being inserted into the joint main body.

4. The method according to claim 3, wherein the second curling step is performing using a second curling die comprising a second curling-dedicated die for placing therein the joint main body having been subjected to the first curling step and a second curling-R die having a shape corresponding to the curled parts and having a curling punch mounted thereto, the curling punch being inserted into the joint main body.

5. The method according to claim 1, wherein in each step, a separate casting process is not performed.

6. The method according to claim 1, wherein the joint assembly comprises a jaw holder mounted in the joint main body in the vicinity of the opening and configured to grip and support an outer diameter of the pipe inserted into the joint main body, and
    wherein the jaw holder is formed on a circumferential surface thereof with a plurality of jaws formed with being circumferentially spaced.

7. The method according to claim 6, wherein each of the jaws is a tooth-shaped portion protruding in the inner-diameter direction of the joint main body and inclined in an insertion direction of the pipe.

* * * * *